United States Patent Office 3,178,264
Patented Apr. 13, 1965

3,178,264
PRODUCTION OF TiO₂ PIGMENTS OF IMPROVED COLOR BY SULFATE PROCESS
Gerard M. Sheehan and Earl R. Lawhorne, Lynchburg, and Horace A. Bragg, Arrington, Va., assignors to American Cyanamid Company, Stamford, Conn., a corporation of Maine
No Drawing. Filed Sept. 28, 1962, Ser. No. 227,077
12 Claims. (Cl. 23—202)

The present application is a continuation-in-part of copending application Serial No. 172,795, filed by us on February 12, 1962, now abandoned.

The present invention relates to the purification of hydrous titania. More particularly the invention relates to a method of purifying hydrous titania containing color-producing polyvalent metal ions by solubilizing said ions while the hydrous titania is in aqueous medium.

At the present time, titanium dioxide pigment is manufactured by a process which is based on the steps of reacting a ferrotitaniferous ore or slag with sulfuric acid to form a digestion cake; dissolving the cake in water thereby forming a titanic sulfate-iron sulfate solution; selectively hydrolyzing the titanic sulfate thereby forming a precipitate of hydrous titania in dilute aqueous sulfuric acid containing iron sulfate as impurity; filtering off the acid solution; washing the hydrous titania; and calcining the hydrous titania to titanium dioxide.

When rutile titanium dioxide pigment is desired, it is customary to add to the hydrous titania described above a small amount of "rutile seed" (hydrous titania having a rutile configuration), which causes the hydrous titania to convert more easily to the rutile form on calcination.

Ferrotitaniferous ores and slags contain color-forming polyvalent metal impurities in addition to iron (e.g., chromium, vanadium, manganese, tungsten, niobium and under certain circumstances, aluminum) and a part of these impurities is strongly retained by the hydrous titania when the acid solution is filtered off as described above. Experience has shown that washing the hydrous titania with chemically pure water for as long as 12 hours is usually insufficient to remove the last significant amounts of these impurities; cf. Stanley et al. U.S. Patent No. 3,000,704 (1961).

The presence of these impurities in hydrous titania is readily detectable by calcining the hydrous titania to titanium dioxide pigment. The impurities cause the hydrous titania to seem dull or off-white in color when compared with pure titanium dioxide pigment.

The discovery has now been made that the aforementioned impurities in the hydrous titania are solubilized at least in part when the hydrous titania is contacted with an aqueous solution of a neutral (i.e., essentially non-ionic) polyhydric alcohol.

In preferred instances, this treatment has removed impurities to such an extent that the titanium dioxide pigment produced when the treated hydrous titania is calcined is improved by four discernible units of brightness over pigment produced from corresponding hydrous titania which has not been so treated.

The process of the present invention is based on the steps of contacting hydrous titania containing color-forming metal ion impurities with an aqueous solution of an essentially non-ionic alcohol, and then removing the solution containing the impurities which have been solubilized.

Polyhydric alcohols suitable for use in the process include the lower aliphatic polyhydric alcohols including glycol and the polyglycols, glycerol and the polyglycerols, the sugar alcohols for example mannitol and sorbitol; and the polymeric alcohols (for example, polyvinyl alcohol, the water-soluble partial esters of polyhydric alcohols, and the polyhydric alcohol formed by copolymerizing vinyl chloride in minor amount with a major amount of vinyl acetate followed by partial or complete hydrolysis of the acetate substituents). The invention includes polyhydric aryl alcohols, for example hydroquinone and pyrocatechol, and further includes the use of mixtures of the aforementioned polyhydric alcohols. As little as 0.05% of polyhydric alcohol, based on the weight of the TiO₂ equivalent of the hydrous titania, produces a perceptible improvement. On the other hand, the improvement effected by increments in excess of 5% is small, so that principal benefits of the invention are obtained within these percentages. The polyhydric alcohols are preferably employed in amounts between 0.1% and 1%, based on the weight of the TiO₂ equivalent of the hydrous titania, because in this range the polyhydric alcohols produce their greatest effect per unit weight added.

The polyhydric alcohols act effectively under alkaline as well as under acid conditions so that the invention does not appear to depend on the prevailing pH. Best improvement in brightness appears to be obtained under acid conditions, and for this purpose the strong acids (hydrochloric, phosphoric and trichloroacetic) may be used. Because of its availability and the good results which it affords, sulfuric acid is preferred. The acids are effective when present in amount between 0.1% and 20% of the weight of the solution.

Preferably the treating solution contains a small amount of a water-soluble reducing agent as well. The effect of the reducing agent is evidently to reduce at least some of the color-forming polyvalent metal ions to a state of low valence, wherein they are more easily solubilized. The preferred reducing agent is titanous sulfate; a significant benefit is obtained from the use of 1% to 5% of titanous sulfate based on the aqueous phase of the composition.

The invention does not depend upon the use of preferred quantities of the treating agents, and a substantial benefit is generally obtained by use of larger or smaller quantities.

The hydrous titania treated according to the process of the present invention may be the material directly recovered from the hydrolysis of the digestion cake solution. Preferably, however, such material is first subjected to a washing with water so as to remove as large a proportion as practical of the color-forming metal ions present. The hydrous titania treated according to the invention may contain such other materials as are often present therein including rutile seed, extenders including calcium sulfate and barium sulfate, and alkali, for example, sodium hydroxide, as is the case when the hydrous titania is converted into rutile seed.

Moreover, the hydrous titania may be treated while it is being manufactured into rutile seed.

The purification process may be carried out at any convenient temperature. The process, however, is slow at room and moderately elevated temperatures, and we prefer, therefore, to carry it out at the boiling point of the slurry. This temperature is without detriment to the pigment.

Preferably the hydrous titania is gently agitated or washed with the solution of the alcohol, but any other convenient method of contacting the hydrous titania with the solution may be used.

If desired, the treatment may be continued until the action of the alcohol is substantially complete. A significant improvement is usually obtained in a few hours, but about twelve hours or even more are needed for substantially complete realization of the benefits of the treatment depending chiefly on the temperature of the slurry and the amount and kind of alcohol used.

The treated slurry may be washed with water or with an aqueous solution of an organic surface-active agent (cf. Stanley et al. patent cited above), whereby further improvement is generally effected.

The invention will be more particularly described with reference to the examples which follow. These examples are preferred embodiments and are not to be construed as limitations on the invention.

*Example 1*

The following illustrates a preferred method of purifying hydrous titania according to the present invention, and shows the comparative effectiveness of a variety of non-ionic polyhydric alcohols.

3330 g. of washed hydrous titania equivalent after calcination to 1000 g. of titanium dioxide and containing about 100 p.p.m. ($TiO_2$ basis) of adsorbed color-forming polyvalent metal ions including niobium, vanadium, chromium and iron, is slurried with 850 ml. of 20% sulfuric acid. The batch containing about 4.1% $H_2SO_4$ by weight is divided into portions. One is reserved as control. To each of the others is added one of the polyhydric alcohols, as shown in the table below. Each portion (including the control) is boiled for two hours with moderate stirring and mixed with rutile seed. The aqueous phase is filtered off. The solids are washed for four hours with 7.5 liters of neutral distilled water at 60° C., calcined to rutile titanium dioxide pigment, and converted into a white paint (all by standard laboratory procedure). The resulting paints (viewed as pulldowns) are visually rated for brightness against laboratory brightness standards.

Results are as follows:

| Run No. | Polyhydric Alcohol Used | | Pigment Brightness | |
|---|---|---|---|---|
| | Name | Percent[1] | Found | Increase[2] |
| Control | None | | 94 | |
| 1 | Ethylene glycol | 0.5 | 95 | 1 |
| 2 | Sorbitol | 0.2 | 96 | 2 |
| 3 | Sorbitan monolaurate | 0.5 | 95 | 1 |
| 4 | Reaction product of sorbitan monolaurate with ethylene oxide. | 0.5 | 95 | 1 |
| 5 | Reaction product of sorbitan monopalmitate with ethylene oxide. | 0.5 | 96 | 2 |
| 6 | Reaction product of sorbitan monostearate with ethylene oxide. | 0.5 | 95 | 1 |
| 7 | Polyvinyl alcohol | 0.5 | 96 | 2 |
| 8 | Mannitol | 0.5 | 96 | 2 |

[1] Based on weight of $TiO_2$ equivalent of the hydrous titania.
[2] Over control.

*Example 2*

The following illustrates the effect of variations in the amount of the polyhydric alcohol used. The procedure is essentially a repetition of the procedure of Example 1.

| Run No. | Polyhydric Alcohol Used | | Pigment Brightness | |
|---|---|---|---|---|
| | Name | Percent[1] | Found | Increase |
| Control | None | None | 93 | |
| 1 | Sorbitol | 0.1 | 94 | 1 |
| 2 | do | 0.2 | 96 | 3 |
| 3 | do | 0.4 | 96 | 3 |
| 4 | do | 0.5 | 96 | 3 |
| 5 | do | 1.0 | 97 | 4 |
| 6 | Polyvinyl alcohol | 0.1 | 94 | 1 |
| 7 | do | 0.2 | 94 | 1 |
| 8 | do | 0.4 | 95 | 2 |
| 9 | do | 0.5 | 95 | 2 |
| 10 | do | 1.0 | 96 | 3 |

[1] Based on $TiO_2$ equivalent of the hydrous titania.

*Example 3*

The following is another preferred method for performing the process of the present invention.

To 1000 cc. of a slurry of 250 g. of washed hydrous titania ($TiO_2$ basis) in water is added 2 g. of sorbitol and the slurry is gently stirred at room temperature for 10 minutes. There is then added with continued stirring 50 g. of 100% $H_2SO_4$ followed by 50 cc. of a 10% by weight solution of titanous sulfate in 15% sulfuric acid. The slurry is then boiled for two hours.

The hydrous titania is filtered off, washed with water for four hours on a vacuum filter to remove the solubilized impurities, and calcined. An anatase pigment is obtained of appreciably improved brightness.

*Example 4*

The process of Example 3 is repeated except that 0.5 g. of hydroquinone is added in place of the sorbitol. The treatment improves the brightness of the pigment by two points.

*Example 5*

A slurry containing 25% by weight ($TiO_2$ basis) of washed hydrous titania is adjusted to pH 11 by addition of sodium hydroxide solution. One portion is reserved as control and to the other portion is added 0.2% of sorbitol (based on the $TiO_2$ equivalent of the hydrous titania). Both suspensions are then processed as described in Example 1.

The brightness of the resulting pigment prepared by use of sorbitol is better than that of the control pigment.

*Example 6*

The following illustrates the improvement in brightness which occurs when rutile titanium dioxide is manufactured from hydrous titania and rutile seed which have both been treated according to the present invention.

Rutile seed is prepared by the method of Tanner et al. U.S. Patent No. 2,427,165 (1947) and the present application as follows:

Hydrous titania which had been treated with sorbitol as shown in Example 1 of the present application is slurried in sufficient 50% sodium hydroxide solution to convert about 25 mol percent of the hydrous titania to sodium titanate; the sodium hydroxide contains 0.2% of sorbitol based on the $TiO_2$ equivalent of the titania. The slurry is heated at 110° C. for two hours. The aqueous phase is then filtered off, the recovered solids are washed with water; the solids are reslurried in water at 50° C., containing 0.2% of sorbitol based on the $TiO_2$ equivalent of the solids; sufficient hydrochloric acid is added to convert the sodium titanate content of the slurry to hydrous titania and to adjust the pH of the slurry to 3; and the hydrous titania (now rutile seed) is recovered by filtration, washed with water, and reslurried in hydrochloric acid.

A quantity of washed hydrous titania is purified by treatment with sorbitol as shown in Example 1 and during the treatment (at the end of the two-hour boil) is treated with 2% ($TiO_2$ basis) of the above-described rutile seed. The hydrous titania is then processed into pigment and tested for its brightness, both as described in Example 1.

The pigment has a brightness of 94, whereas pigment prepared in the same manner, except for the two additions of sorbitol during the manufacture of the rutile seed, has a brightness of 93.

We claim:

1. A process for purifying hydrous titania containing color-forming polyvalent metal ions, which comprises contacting said hydrous titania with an aqueous solution containing between 0.05% and 5%, based on the $TiO_2$ equivalent of said hydrous titania, of an esesntially non-ionic polyhydric alcohol, thereby solubilizing at least part of said ions, and thereafter removing said solution containing said solubilized ions.

2. A process for purifying hydrous titania containing color-forming polyvalent metal ions, which comprises contacting said hydrous titania with a boiling solution containing between 0.05% and 5%, based on the weight of the $TiO_2$ equivalent of said hydrous titania, of an essentially non-ionic polyhydric alcohol and between 0.1% and 20% of the weight of the solution of sulfuric acid, thereby solubilizing at least part of said ions, and thereafter removing said solution containing said solubilized ions.

3. In the manufacture of rutile titanium dioxide by a process which includes the steps of preparing hydrous titania, converting a part of said hydrous titania to rutile seed by reaction first with sodium hydroxide and then with hydrochloric acid, mixing said hydrous titania with a minor amount of said rutile seed, and calcining the mixture to form rutile titanium dioxide, the improvement which consists in contacting said rutile seed with an aqueous solution containing between 0.05% and 5%, based on the weight of the $TiO_2$ equivalent of said seed, of an essentially non-ionic polyhydric alcohol, thereby solubilizing at least part of the color-forming polyvalent metal ions present and thereafter removing the resulting solution containing said solubilized ions.

4. A process according to claim 1 wherein the amount of polyhydric alcohol is 0.1% to 1% of the $TiO_2$ equivalent of the hydrous titania.

5. A process for purifying hydrous titania containing color-forming polyvalent metal ions, which comprises contacting said hydrous titania with an aqueous solution containing between 0.05% and 5%, based on the $TiO_2$ equivalent of said hydrous titania, of sorbitol, thereby solubilizing at least part of said ions, and thereafter removing said solution containing said solubilized ions.

6. A process according to claim 5 wherein the amount of sorbitol is 0.1% to 1% of the $TiO_2$ equivalent of the hydrous titania.

7. A process for purifying hydrous titania containing color-forming polyvalent metal ions, which comprises contacting said hydrous titania with an aqueous solution containing between 0.05% and 5%, based on the $TiO_2$ equivalent of said hydrous titania, of mannitol, thereby solubilizing at least part of said ions, and thereafter removing said solution containing said solubilized ions.

8. A process according to claim 7 wherein the amount of mannitol is 0.1% to 1% of the $TiO_2$ equivalent of the hydrous titania.

9. A process for purifying hydrous titania containing color-forming polyvalent metal ions, which comprises contacting said hydrous titania with an aqueous solution containing between 0.05% and 5%, based on the $TiO_2$ equivalent of said hydrous titania, of a sorbitan monopalmitate-ethylene oxide reaction product, thereby solubilizing at least part of said ions, and thereafter removing said solution containing said solubilized ions.

10. A process according to claim 9, wherein the amount of a sorbitan monopalmitate-ethylene oxide reaction product is 0.1% to 1% of the $TiO_2$ equivalent of the hydrous titania.

11. A process for purifying hydrous titania containing color-forming polyvalent metal ions, which comprises contacting said hydrous titania with an aqueous solution containing between 0.05% and 5%, based on the $TiO_2$ equivalent of said hydrous titania, of polyvinyl alcohol, thereby solubilizing at least part of said ions, and thereafter removing said solution containing said solubilized ions.

12. A process according to claim 11 wherein the amount of polyvinyl alcohol is 0.1% to 1% of the $TiO_2$ equivalent of the hydrous titania.

References Cited by the Examiner
UNITED STATES PATENTS

| | | | |
|---|---|---|---|
| 2,804,375 | 8/57 | Kamlet | 23—202 |
| 3,000,704 | 9/61 | Stanley et al. | 23—202 |
| 3,063,807 | 11/62 | Kenworthy | 23—202 |

OTHER REFERENCES

Barksdale's book on "Titanium," 1949 ed., page 156, The Ronald Press Co., N.Y.

MAURICE A. BRINDISI, *Primary Examiner.*